(12) United States Patent
Baek et al.

(10) Patent No.: US 11,745,650 B2
(45) Date of Patent: Sep. 5, 2023

(54) DYNAMIC LAMP UNIT AND CONTROL METHOD THEREFOR

(71) Applicant: LS AUTOMOTIVE TECHNOLOGIES CO., LTD., Anyang-si (KR)

(72) Inventors: Sung Ho Baek, Siheung-si (KR); Dae Kyung Kim, Ansan-si (KR); Hyuk Soo Kim, Incheon (KR)

(73) Assignee: LS AUTOMOTIVE TECHNOLOGIES CO., LTD., Anyang-si (KR)

( * ) Notice: Subject to any disclaimer, the term of this patent is extended or adjusted under 35 U.S.C. 154(b) by 84 days.

(21) Appl. No.: 17/418,544

(22) PCT Filed: Dec. 26, 2019

(86) PCT No.: PCT/KR2019/018511
§ 371 (c)(1),
(2) Date: Jun. 25, 2021

(87) PCT Pub. No.: WO2020/138969
PCT Pub. Date: Jul. 2, 2020

(65) Prior Publication Data
US 2022/0072996 A1    Mar. 10, 2022

(30) Foreign Application Priority Data

Dec. 28, 2018 (KR) ........................ 10-2018-0172009

(51) Int. Cl.
*B60Q 3/64* (2017.01)
*B60Q 3/54* (2017.01)
(Continued)

(52) U.S. Cl.
CPC ................. *B60Q 3/64* (2017.02); *B60Q 3/54* (2017.02); *B60Q 3/74* (2017.02); *B60Q 3/80* (2017.02); *G02B 6/001* (2013.01)

(58) Field of Classification Search
CPC ... B60Q 3/64; B60Q 3/54; B60Q 3/74; G02B 6/001; G02B 6/0036
(Continued)

(56) References Cited

U.S. PATENT DOCUMENTS 10,600,996 B2    3/2020   Park
2010/0142226 A1  6/2010   Vogt et al.
(Continued)

FOREIGN PATENT DOCUMENTS

CN      105137522 A  * 12/2015  ........... G02B 6/0035
KR      10-2009-0114666 A   11/2009
(Continued)

*Primary Examiner* — Laura K Tso
(74) *Attorney, Agent, or Firm* — Rabin & Berdo, P.C.

(57) ABSTRACT

The present invention provides a dynamic lamp device (10) comprising: a housing (100); a substrate unit (200) disposed on the housing; and a lamp unit (300) at least partially connected to the substrate unit (200) and configured to allow light emitted therefrom to exit the housing (100) toward the outside of the housing, wherein the lamp unit (300) comprises: one or more lamp light delivery units (320) disposed in the housing (100) and each having a predetermined length; a lamp light source unit (330) disposed at each of both ends of each of the lamp light delivery units (320) and configured to deliver light emitted therefrom to the lamp light delivery unit (320); and a control unit (20) configured to apply a light source control signal to the lamp light source unit (330) disposed at each of the both ends of the lamp light delivery unit (320) to change the intensity of light along the length of the lamp light delivery unit (320) to cause a predetermined intensity zone having a predetermined light
(Continued)

intensity to be shifted along the length of the lamp light delivery unit (320), and a control method thereof.

15 Claims, 13 Drawing Sheets

(51) Int. Cl.
*B60Q 3/80* (2017.01)
*B60Q 3/74* (2017.01)
*F21V 8/00* (2006.01)

(58) Field of Classification Search
USPC .......................................................... 362/511
See application file for complete search history.

(56) References Cited

U.S. PATENT DOCUMENTS

| 2014/0140088 | A1* | 5/2014 | Griebel | B60Q 1/381 |
| | | | | 362/555 |
| 2015/0257224 | A1* | 9/2015 | Timm | F21K 9/20 |
| | | | | 315/77 |
| 2016/0103261 | A1* | 4/2016 | Bauco | G02B 6/0288 |
| | | | | 362/552 |
| 2017/0192156 | A1* | 7/2017 | Song | G02B 6/0038 |

FOREIGN PATENT DOCUMENTS

| KR | 10-2017-0083442 A | 7/2017 |
| KR | 10-2018-0056184 A | 5/2018 |
| KR | 10-2018-0076891 A | 7/2018 |

* cited by examiner $d_{413\text{-}1a} \geq d_{413\text{-}2a} \geq d_{413\text{-}3a}$ $d_{413\text{-}3ad} \leq d_{413\text{-}2ad} \leq d_{413\text{-}1ad}$ $w_{413\text{-}1a} \geq w_{413\text{-}2a} \geq w_{413\text{-}3a}$ $w_{413\text{-}3ad} \leq w_{413\text{-}2ad} \leq w_{413\text{-}1ad}$

DYNAMIC LAMP UNIT AND CONTROL METHOD THEREFOR

TECHNICAL FIELD

The present invention relates to a lamp device for a vehicle, and more particularly, to a lamp device that performs a dynamic lighting function using a minimum number of lamp light source units, and a control method thereof.

BACKGROUND ART

A vehicle such as an automobile requires functions of various kinds of convenience means for offering a more stable and comfortable driving state, beyond a function of the vehicle as a means of transportation. Thus, the vehicle is equipped with various convenient facilities, and a variety of kinds of switches for operating and controlling them. For example, the vehicle includes a window switch for opening or closing a window, a steering light switch for turning on or off a steering light, an audio switch for driving an audio device, a wiper switch for driving a wiper, and the like. Besides, the vehicle also includes a variable switch for controlling the illumination state of an indoor lighting or a headlight for the vehicle.

In addition, the vehicle additionally includes a lighting device such as an ambient lamp in the interior space thereof in order to enhance driver satisfaction while driving the vehicle, and shows a trend toward an increase in the demand for various convenience electrical devices.

However, such a conventional prior art lighting device disposed in the interior space of the vehicle has a limitation in that it inevitably should take a configuration of increasing the number of LEDs in order to implement more various operations.

DISCLOSURE OF INVENTION

Technical Problem

Accordingly, the present invention has been made to solve the above-mentioned problems occurring in the prior art, and it is an object of the present invention to provide a dynamic lamp device that performs a desired dynamic lighting function using a minimum number of lamp light source units, and a control method thereof.

Technical Solution

To achieve the above object, in one aspect, the present invention provides a dynamic lamp device (10) including: a housing (100); a substrate unit (200) disposed on the housing; and a lamp unit (300) at least partially connected to the substrate unit (200) and configured to allow light emitted therefrom to exit the housing (100) toward the outside of the housing, wherein the lamp unit (300) includes: one or more lamp light delivery units (320) disposed in the housing (100) and each having a predetermined length; a lamp light source unit (330) disposed at each of both ends of each of the lamp light delivery units (320) and configured to deliver light emitted therefrom to the lamp light delivery unit (320); and a control unit (20) configured to apply a light source control signal to the lamp light source unit (330) disposed at each of the both ends of the lamp light delivery unit (320) to change the intensity of light along the length of the lamp light delivery unit (320) to cause a predetermined intensity zone having a predetermined light intensity to be shifted along the length of the lamp light delivery unit (320).

In the dynamic lamp device, the intensity of light outputted from the lamp light delivery unit (320) in response to the light source control signal applied to the lamp light source unit (330) from the control unit (20) may include a plurality of levels of light intensity.

In the dynamic lamp device, a plurality of ends of the lamp light delivery unit (320) may be disposed at the lamp light source unit (330).

In the dynamic lamp device, the lamp light delivery unit (320) may include a predetermined surface pattern unit formed on a surface thereof.

In the dynamic lamp device, the surface pattern unit (400) may be embossed in a projected shape on the surface of the lamp light delivery unit (320).

In the dynamic lamp device, the surface pattern unit (400) may include a light exit surface (414) oriented in the direction in which it goes from at least one of the lamp light source units (330) toward the other thereof, and the light exit angle formed between the light exit surface of the surface pattern unit 400 and the surface of the lamp light delivery unit (320) may be sequentially increased or equal as it goes from at least one of the lamp light source units (330) toward the other thereof and vice-versa.

In the dynamic lamp device, the height (d413, d413a) of the surface pattern unit (400) from the surface of the lamp light delivery unit (320) may be sequentially reduced or equal as it goes from at least one of the lamp light source units (330) toward the other thereof and vice-versa.

In the dynamic lamp device, the width (w413) of the surface pattern unit (400) when projected onto a plane parallel to the length direction of the lamp light delivery unit (320) may be sequentially reduced or equal as it goes from at least one of the lamp light source units (330) toward the other thereof and vice-versa.

In the dynamic lamp device, the surface pattern unit (400) may be engraved in a recessed shape on the surface of the lamp light delivery unit (320).

In the dynamic lamp device, the surface pattern unit (400) may include a light exit surface (414) oriented in the direction in which it goes from at least one of the lamp light source units (330) toward the other thereof, and the light exit angle formed between the light exit surface (414) of the surface pattern unit 400 and the surface of the lamp light delivery unit (320) is sequentially reduced or equal as it goes from at least one of the lamp light source units (330) toward the other thereof and vice-versa.

In the dynamic lamp device, the height (depth, d412-9) of the surface pattern unit (400) from the surface of the lamp light delivery unit (320) may be sequentially reduced or equal as it goes from at least one of the lamp light source units 330 toward the other thereof or vice-versa.

In the dynamic lamp device, the width (w413) of the surface pattern unit 400 when projected onto a plane parallel to the length direction of the lamp light delivery unit (320) may be sequentially reduced or equal as it goes from at least one of the lamp light source units (330) toward the other thereof and vice-versa.

In the dynamic lamp device, the surface pattern unit (400) may include a light exit surface (414) oriented in the direction in which it goes from at least one of the lamp light source units (330) toward the other thereof, and the light exit surface (414) may be surface-treated unevenly.

In another aspect, the present invention provides a method of controlling a dynamic lamp device, the method which includes: a provision step (S10) of providing the dynamic lamp device (10) including: a housing (100); a substrate unit (200) disposed on the housing; and a lamp unit (300) at least partially connected to the substrate unit (200) and configured to allow light emitted therefrom to exit the housing (100) toward the outside of the housing, wherein the lamp unit (300) includes: one or more lamp light delivery units (320) disposed in the housing (100) and each having a predetermined length; a lamp light source unit (330) disposed at each of both ends of each of the lamp light delivery units (320) and configured to deliver light emitted therefrom to the lamp light delivery unit (320); and a control unit (20) configured to apply a light source control signal to the lamp light source unit (330) disposed at each of the both ends of the lamp light delivery unit (320) to change the intensity of light along the length of the lamp light delivery unit (320) to cause a predetermined intensity zone having a predetermined light intensity to be shifted along the length of the lamp light delivery unit (320); an input unit (60) configured to allow a select input signal for selecting an operating mode of the lamp light source unit (330) by a user to be inputted thereto; and a storage unit (30) connected to the control unit (20) and configured to store preset data containing information regarding the operating mode; an input step (S20) of allowing the user to input a mode input signal to be applied to the control unit (20); a mode determination step (S30) of allowing the control unit (20) to determine an operating mode selected based on the mode input signal and the preset data; and a mode execution step (S40) of allowing the control unit (20) to apply an operating control signal to the lamp light source unit (330) to execute the operating mode determined in the mode determination step (S30).

In the method for controlling a dynamic lamp device, the mode determination step (S30) may include: a mode input signal confirmation step (S31) of allowing the control unit (20) to confirm the application of the mode input signal inputted by the user through the input unit (60); a dynamic mode determination step (S33) of allowing the control unit (20) to determine whether or not the operating mode selected by the user based on the mode input signal and the preset data is a dynamic mode; and a mode setting step (S35, S37) of allowing the control unit (20) to finally set an operating mode which is to be executed by the control unit (20) based on a determination result in the dynamic mode determination step (S33).

In the method for controlling a dynamic lamp device, the mode execution step (S40) may include: a set operating mode confirmation step (S41) of allowing the control unit (20) to confirm the operating mode set in the mode determination step (S30); and a dynamic mode execution step (S43) of allowing the control unit (20) to executes the dynamic mode if it is determined that the set operating mode confirmed in the set operating mode confirmation step (S4)1 is the dynamic mode, and the dynamic mode execution step (S43) may include: a dynamic data confirmation step (S431) of allowing the control unit (20) to confirm dynamic data contained in the preset data; a lamp light source signal calculation step (S433) of allowing the control unit (20) to control the arithmetic unit (40) connected to the control unit (20) to calculate lamp light source unit's plural time-dependent individual signals to be outputted from the lamp light source unit based on the mode input signal and the preset data; and a lamp light source unit dynamic output step (S435) of allowing the control unit (20) to outputs the lamp light source unit's plural time-dependent individual signals calculated in the lamp light source signal calculation step (S433) for application to the lamp light source unit (330).

Advantageous Effects

The dynamic lamp device and control method thereof according to the embodiments of the present invention as constructed above has the following advantageous effects.

First, the dynamic lamp device and control method thereof according to the present invention enables to implement a predetermined dynamic lighting mode through a minimum number of lamp light source units, so that a desired emotional quality improvement function can be accomplished while minimizing the manufacture cost.

Second, the dynamic lamp device and control method thereof according to the present invention can involve the effects of simplicity of the manufacture process and improvement of a degree of design freedom through minimization of the number of lamp light source units.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Figure 1:
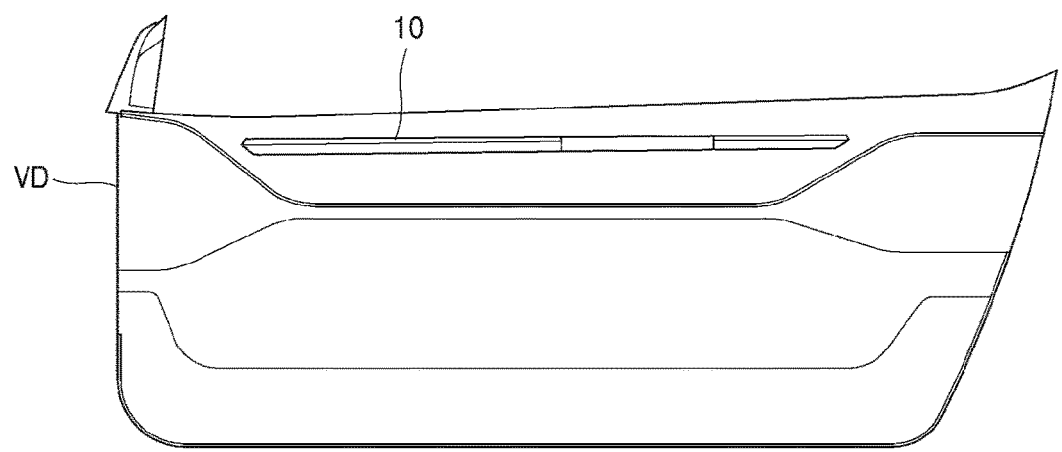
FIG. 1 is a schematic view illustrating a mounting state of a dynamic lamp device according to an embodiment of the present invention.
Figure 2:
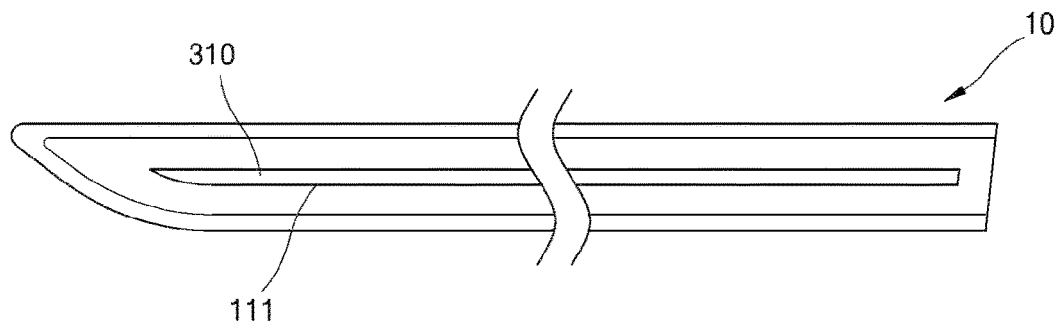
FIGS. 2 to 4 schematically illustrate a top plan view of, a partial side view of, and a block diagram showing a configuration of a dynamic lamp device according to an embodiment of the present invention.
Figure 3:
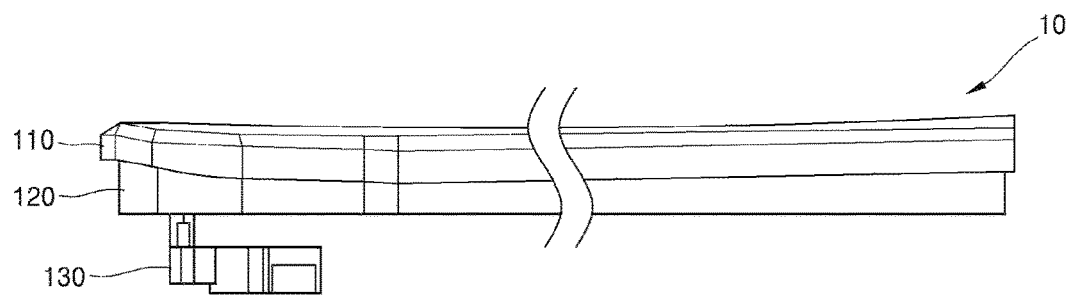
Figure 4:
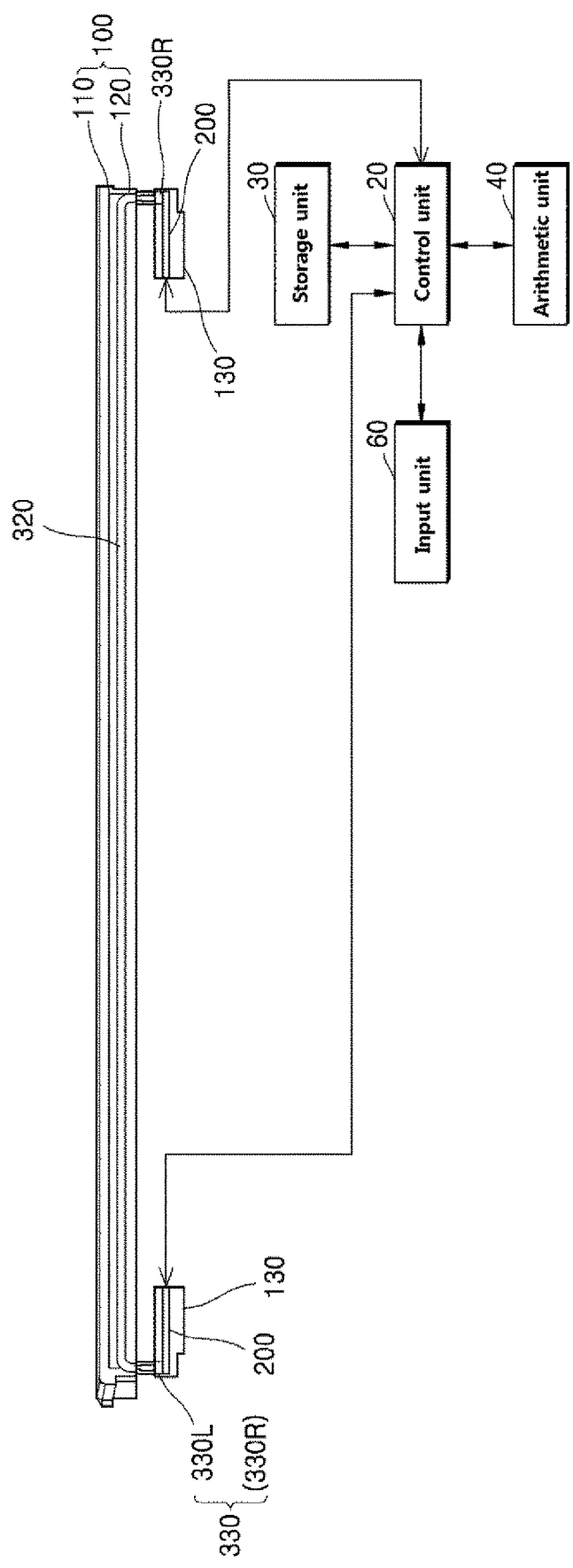

Hereinafter, a dynamic lamp device according to preferred embodiments of the present invention will be described in detail with reference to the accompanying drawings.

A dynamic lamp device 10 according to an embodiment of the present invention is implemented as an ambient lamp that is disposed in the interior space of the vehicle to create a mood in the vehicular interior space.

The dynamic lamp device 10 of the present invention performs a predetermined dynamic lighting function of changing an output signal continuously for visual recognition to enable to visually recognize the dynamic change of the illumination state besides a static lighting function of outputting simple light in a fixed state while minimizing the number of light sources implemented as LEDs.

As shown in FIGS. 1 to 4, the dynamic lamp device 10 includes a housing 100, a substrate unit 200, and a lamp unit 300. The housing 100 is fixedly mounted to the interior trim of a predetermined vehicular door (VD). The housing 100 includes a housing body 110 and a housing base 120. The housing base 120 is fixedly mounted to the inside of the interior trim of the vehicular door, and the housing body 110 is engaged with the housing base 120 to provide an internal space between the housing base 120 and the housing body 110 when assembled so as to fix the position of other constituent elements.

The housing body 110 is exposed to the outside of the interior trim of the vehicular door. The housing body 110 includes a body through-hole 111 formed therein to allow a lamp light indicator cover 310 of the lamp unit 300 to be insertedly disposed therein. Thus, light emitted from the lamp light source unit 330 disposed within the housing body 110 and exiting the lamp light delivery unit 320 can be emitted to the outside through the lamp light indicator cover 310.

In this embodiment of the present invention, the housing 100 includes a housing connector 130. The housing connector 130 enables the internal arrangement of the substrate unit 200 on which the lamp light source unit 330 implemented as an LED is disposed. The housing connector 130 may include a terminal for electrical connection with an external power supply.

As described above, the lamp light source unit 330 of the lamp unit 300 is disposed on the substrate unit 200. Besides, a power terminal is also disposed on the substrate unit 200 so that electric power can be supplied to a control unit 20 connected to the lamp light source unit 330 and the substrate unit 200 through the electrical connection with the external power supply, and to a storage unit 30 and an arithmetic unit 40, which are connected to the control unit 20.

The lamp unit 300 is at least partially connected to the substrate unit 200 and allows light emitted therefrom to exit the housing 100 toward the outside of the housing. The lamp unit 300 includes one or more lamp light delivery units 320 and a lamp light source unit 330 as partially described above.

The lamp light delivery unit 320 is provided in single number or plural numbers. Although the lamp light delivery unit 320 has been described focusing on a structure in which it is provided in a single number and formed in a linear or curved shape in this embodiment that it can be modified in various manners such as having a structure in which a plurality of the lamp light delivery units 320 are overlapped or branched.

The lamp light delivery unit 320 is disposed in the housing 100, more specifically in an internal space defined between the housing body 110 and the housing base 120. The lamp light delivery unit 320 has a predetermined length. The lamp light delivery unit 320 is made of a light-guiding material. The lamp light source unit 330 is disposed at at least two ends of the lamp light delivery unit 320. In this embodiment, the lamp light delivery unit 320 takes a simple linear or curved shape, and the lamp light source unit 330 (330L, 330R) is disposed at each of both ends of the lamp light delivery unit 320.

Although the lamp light source unit 330 is implemented as an LED in this embodiment, it can be selected in various manners within the scope of taking a luminescence-capable configuration. The lamp light source unit 330 is disposed at each of both ends of at least one lamp light delivery unit 320. As mentioned above, in this embodiment, the lamp light delivery unit 320 takes a simple linear or curved shape, and the lamp light source unit 330 is disposed at each of both ends of the lamp light delivery unit 320. The lamp light source unit 330 may include a separate constituent element for preventing leakage of light at the periphery thereof.

Light emitted from the lamp light source unit 330 is incident into the lamp light delivery unit 320 through both ends of the lamp light delivery unit 320, and then exits to the outside through the body through-hole 111 of the housing 100.

The lamp light source unit 330 disposed at each of both ends of the lamp light delivery unit 320 is controlled in a separate and independent manner so that the light incident into both ends of the lamp light delivery unit 320 according to the control of a separate output signal from the lamp light source unit 330 can be combined in the lamp light delivery unit 320, and the color or intensity of the light combined depending on the control and change of the output signal from the lamp light source unit 330 can perform a dynamic lighting function which varies along the length of the lamp light delivery unit 320.

In other words, the dynamic lamp device 10 of the present invention further includes a control unit 20. The control unit 20 may apply a light source control signal to each of the lamp light source units 330 disposed at both ends of the lamp light delivery unit 320 to change the intensity or color of light along the length of the lamp light delivery unit 320 to cause a predetermined intensity or color zone having a predetermined light intensity or color to be shifted along the length of the lamp light delivery unit 320.

The property of light, i.e., the intensity of light outputted from the lamp light source unit 330 in response to the light source control signal applied thereto from the control unit 20, and then delivered through and outputted from the lamp light delivery unit 320 is changed with respect to a plurality of zones along the length of the lamp light delivery unit 320.

The control unit 20 is connected to a storage unit 30 and an arithmetic unit 40. The control unit 20 applies a storage control signal to the storage unit 30 and applies an arithmetic control signal to the arithmetic unit 40. The storage unit 30 has preset data stored therein. The preset data contains information regarding the magnitude of an electrical signal such as voltage or current of the lamp light source unit 330, required to execute an operating mode, i.e., a dynamic mode and a static mode which will be described later. A PWM control is performed in the lamp light source unit 330, and a detained description thereof will be omitted.

As described above, the control unit 20 applies the light source control signal to the lamp light source unit 330 to control the intensity of light outputted from the lamp light source unit 330 to be changed with respect to a plurality of zones along the length of the lamp light delivery unit 320. The preset data stored in the storage unit 30 contains data regarding the intensity of light formed with respect to the plurality of zones divided along the length of the lamp light delivery unit 320 as mentioned above when light is outputted from the lamp light source unit 330.

Such data may be converted in the form of a certain function and stored in the storage unit 30, and is stored as a point data of the intensity of light for the length of the lamp light delivery unit 320. The control unit 20 applies the arithmetic control signal to the arithmetic unit 40 based on the preset data so that the arithmetic unit 40 can calculate an input value of the lamp light source unit 330 to output a light with an intensity needed at a relevant time point at a relevant zone so as to implement an operation mode, i.e., a dynamic mode selected by a user through function operation, interpolation or extrapolation, and the control unit 20 generates a light source control signal corresponding to the input value for application to the lamp light source unit 330.

Figure 5:
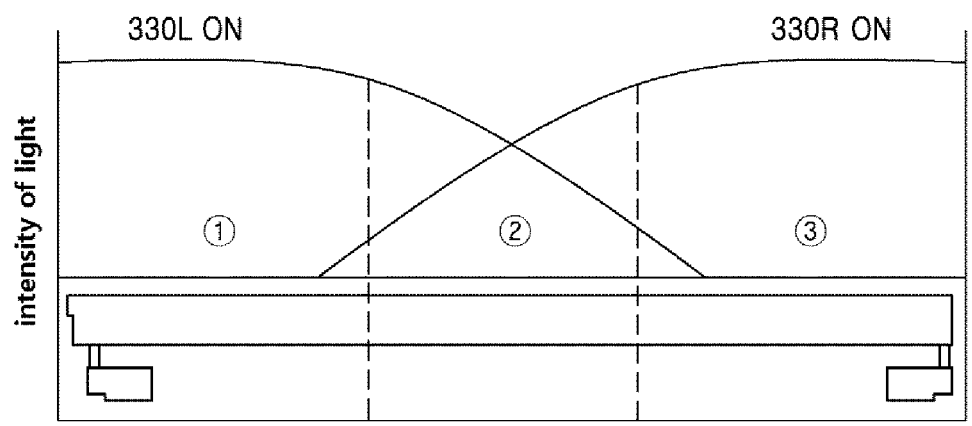
FIGS. 5 and 6 are diagrammatic views illustrating a light output intensity formed along the length of a lamp light delivery unit according to the lighting state of a lamp light source unit of a dynamic lamp device according to an embodiment of the present invention.

In other words, as shown in FIG. 5, the lamp light source units 330 (330L and 330R) are respectively disposed at both ends of the right and left sides of the lamp light delivery unit 320. When the lamp light source units 330 (330L, 330R) disposed at both ends of the lamp light delivery unit 320 are in an ON (lighting) state, a diagram of a light output intensity, i.e., the intensity of light delivered to the lamp light delivery unit 320 from each of the lamp light source units 330 (330L and 330R) and outputted from the lamp light delivery unit 320 along the length of the lamp light delivery unit 320 is shown. That is, in the case where the length of the lamp light delivery unit 320 is divided into three zones ①, ② and ③, the diagram of FIG. 5 shows a shape in which the light output intensity decreases toward opposite directions from both ends of the lamp light delivery unit 320 where the lamp light source units 330 (330L and 330R) implemented as LEDs are disposed. In other words, the diagram of FIG. 5 shows a shape in which, when the left lamp light source unit 330L is assumed to be a reference, a change in the light output intensity is not significant at a first zone ① among the three zones ①, ② and ③, but decreases sharply at a second zone ② and is nearly insignificant at a third zone ③. On the other hand, when the right lamp light source unit 330R is assumed to be a reference, it has a lamp output intensity value opposite to that of the above-described order. As such, the light output intensity formed along the length of the lamp light delivery unit 320 can be stored, as the preset data, in the form of a function or in the form of a plurality of points, and a light output intensity at a desired position or zone can be calculated through a predetermined arithmetic process as described above.

The light output intensity may be controlled by taking a configuration in which a basic light output intensity value increases or decreases through multiplication of a predetermined value, or a value required for the lamp light source unit 330 to output a light with the controlled light output intensity may be calculated.

Figure 6:
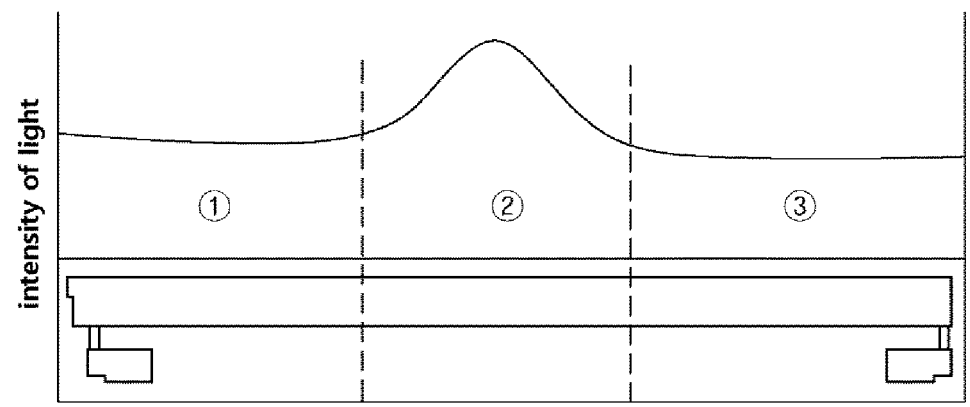

FIG. 5 shows a light output intensity formed along the length of the lamp light delivery unit 320 when the lamp light source units 330 (330L and 330R) are turned on whereas FIG. 6 shows a light output intensity formed along the length of the lamp light delivery unit 320 when all of the lamp light source units 330L and 330R are turned on in response to a light output control signal to allow the lamp light source units 330L and 330R disposed at both ends of the lamp light delivery unit 320 to represent the same basic light output intensity.

In this embodiment, although a shape is shown in which the light output intensity at the second zone ② sharply decreases toward opposite directions from the lamp light source units 330L and 330R along the length of the lamp light delivery unit 320, a light output intensity value, i.e., an output value of light at an intermediate point of the lamp light delivery unit 320, delivered to the lamp light delivery unit 320 from any one of the lamp light source units 330L and 330R and outputted from the lamp light delivery unit 320 may be set to be at least half a light output intensity value at the ends of the lamp light delivery unit. By virtue of such a configuration, as shown in FIG. 6, when the lamp light source units 330L and 330R disposed at both ends of the lamp light delivery unit 320 are turned on to represent the same basic light output intensity, the light output intensity at the second zone ② may be designed to have a light output intensity value greater than those at the first zone ① and the third zone ③. However, the present invention is not limited thereto, but various modifications can be made within the scope of providing a visual effect of continuous shift of the light output intensity at each zone.

Figure 7:
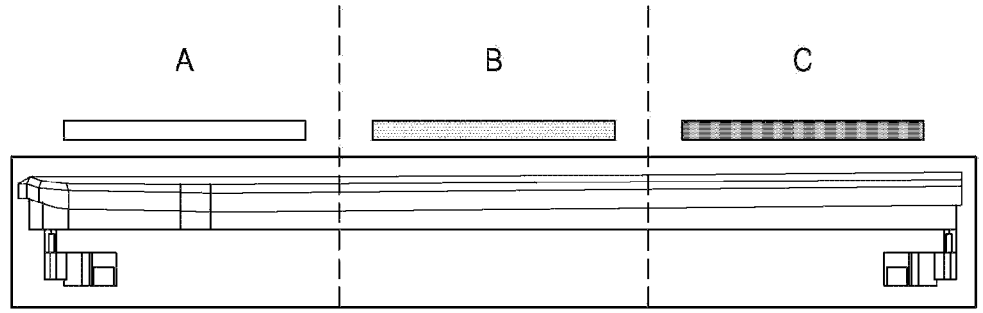
FIGS. 7 to 9 are schematic views illustrating an operating state of a dynamic lamp device according to an embodiment of the present invention.
Figure 8:
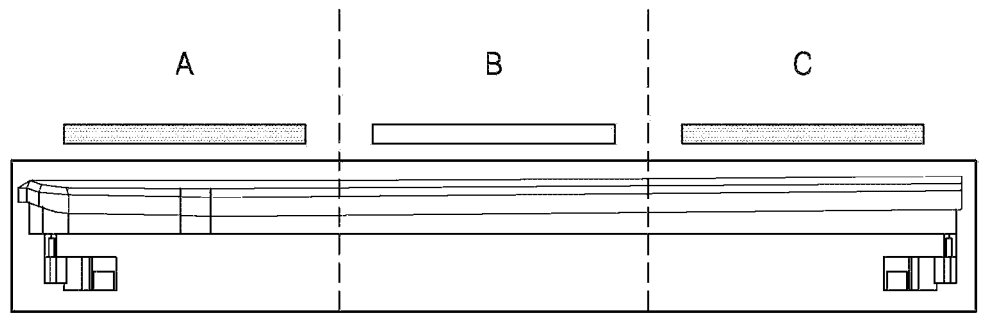
Figure 9:
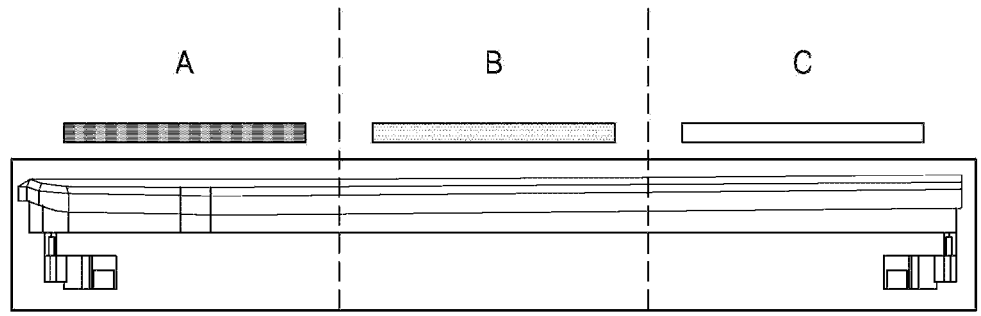

In FIGS. 7 to 9, there is shown an example of an execution state of a dynamic lighting mode, which seems to be a visual shift of a light wave moving through a change of the maximum point in a light output intensity in the sequential order from the left to the right in the case where the lamp light delivery unit 320 is divided into three zones A, B and C. In other words, in FIG. 7, there is shown a light output state according to a light output intensity formed toward the right from the left of the lamp light delivery unit 320 as shown in FIG. 5 when the left lamp light source unit 330L disposed at the left end of the lamp light delivery unit 320 is in an ON state and the right lamp light source unit 330R disposed at the right end of the lamp light delivery unit 320 is in an OFF state on a drawing sheet. The light output intensities at the three zones A, B and C satisfies the following relationship: A>B>C.

Then, as shown in FIG. 8, when the left and right both lamp light source unit 330L are all in an ON state, the light output intensities at the three zones A, B and C satisfies the following relationship: B>A=C. Here, in order to execute the dynamic lighting mode, which seems to be a natural continuous shift of an output light with a high light output intensity value, a light source control signal of the left and right both lamp light source units 330L and 330R can be controlled such that the light output value of the left and right both lamp light source units 330L and 330R at the middle zone B of the lamp light delivery unit 320 is the same or substantially same as the light output intensity value at the zone A as shown in FIG. 7.

Thereafter, as shown in FIG. 9, the left lamp light source unit 330L is allowed to be in an OFF state and the right lamp light source unit 330R is allowed to be in an ON state such that the light output intensities at the three zones A, B and C satisfies the following relationship: C>B>A. As such, the dynamic lighting mode can be executed in which a continuous change in the zone where the light output intensity is maximum can be given a feeling which seems to be a visual shift of a light wave.

For the purpose of this operation, the control unit 20 applies a light source control signal of a predetermined magnitude to each of the left and right lamp light source units at a certain time.

Although it has been described in the above embodiment that the lamp light delivery unit 320 is implemented in a simple linear shape, the present invention is not limited thereto but the lamp light delivery unit can be implemented in a curved shape.

Figure 10:
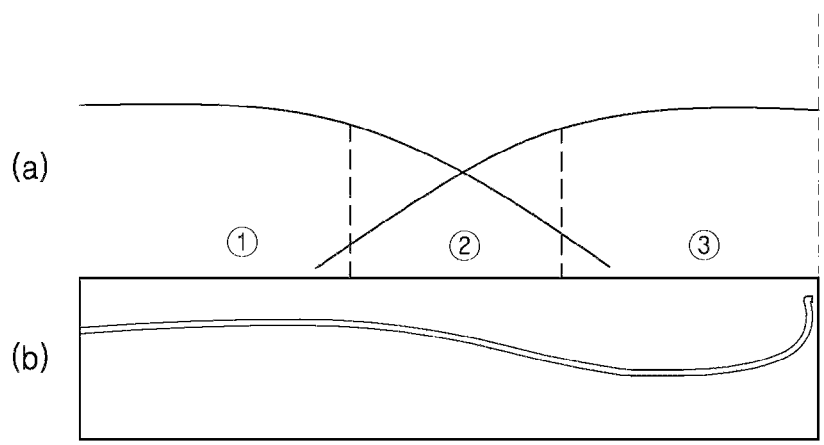
FIG. 10 is a diagrammatic view illustrating a light output intensity formed along the length of a lamp light delivery unit according to the lighting state of a lamp light source unit of a dynamic lamp device according to an embodiment of the present invention.
Figure 11:
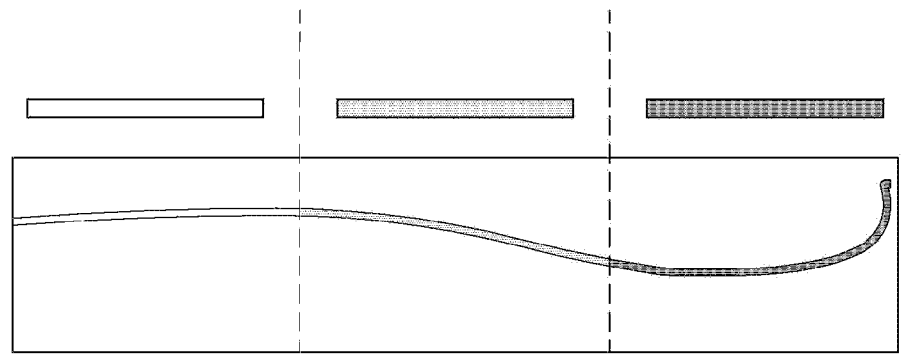
FIGS. 11 to 13 are schematic views illustrating an operating state of a dynamic lamp device according to an embodiment of the present invention.
Figure 12:
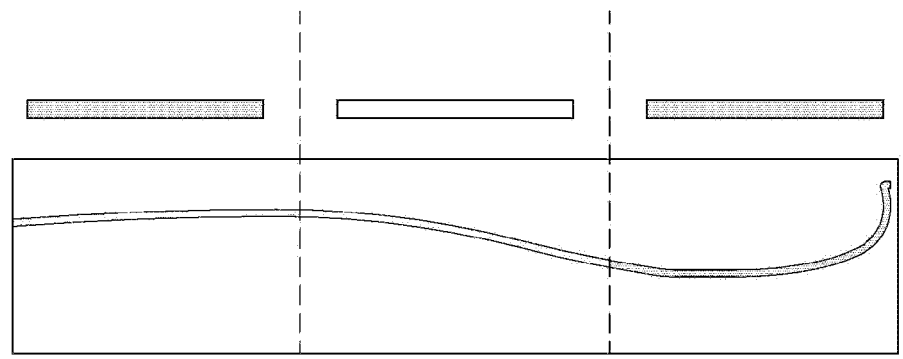
Figure 13:
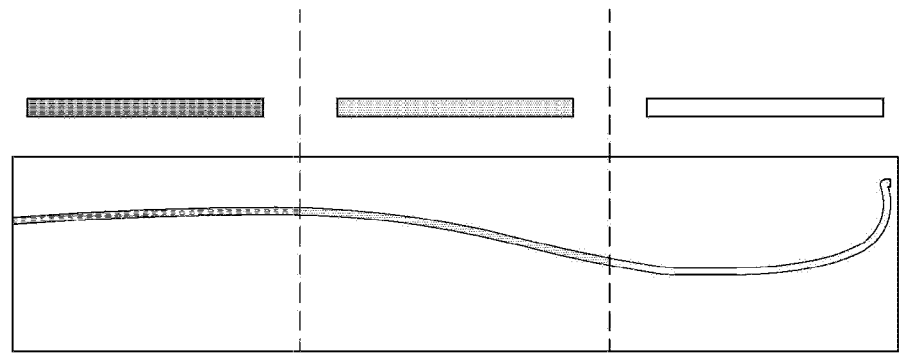

FIGS. 10(*a*) and 10(*b*) show a dynamic lamp device disposed at the interior trim of the vehicular door and a diagram of a light output intensity formed along the length of the dynamic lamp device, which is nearly the same as that in the case shown in FIGS. 5 and 6. Even in the case where the lamp light delivery unit 320 is formed in a curved shape, but not a linear shape due to the material characteristics of the lamp light delivery unit 320 made of a light-guiding material, it exhibits a characteristic nearly similar to that in the case of being formed in the linear shape. FIGS. 11 to 13 show an operating state of a dynamic lamp device of executing a dynamic lighting mode along the length of the lamp light delivery unit, divided into three zones. This operating state of the dynamic lamp device is nearly the same as that in the case shown in FIGS. 7 to 9 as described above. In addition, by controlling the output magnitude of the light source control signal at the lamp light source units disposed at both ends of the lamp light delivery unit, the dynamic lighting mode can be executed which exhibits a predetermined visual effect of allowing a light wave to move as a light expressed as a light output intensity value by a maximum output value from a single lamp light source unit at both ends of the lamp light delivery unit and as a light expressed as a light output intensity value of lights overlapped at the central zone.

The number of zones divided along the length of the lamp light delivery unit of the dynamic lamp device according to the present invention is set to be three in the previous embodiment, but the present invention is not limited thereto. In other words, as shown in FIG. 14, the lamp light delivery unit is divided into a total of five zones A, B, C, D and E along the length of dynamic lamp device, more specifically the lamp light delivery unit, and a light source control signal for controlling the light output intensity of the lamp light source units disposed at both ends of the lamp light delivery unit is applied to the lamp light source units so that a predetermined dynamic lighting mode for the plurality of five zones can be implemented.

TABLE 1

| Operating Stages | Light output intensity (%) (based on maximum output intensity) Left lamp light source unit 330L | Light output intensity (%) of Lamp light delivery unit (based on maximum output intensity) | | | | | Light output intensity (%) (based on maximum output intensity) Right lamp light source unit 330R |
|---|---|---|---|---|---|---|---|
| | | Zone A | Zone B | Zone C | Zone D | Zone E | |
| ① | 100% | 100 | 95 | 70 | 20 | — | 0% |
| ② | 80% | 80.3 | 88 | 77 | 60.5 | 30.8 | 30% |
| ③ | 70% | 70.7 | 94.5 | 98 | 94.5 | 70.7 | 70% |
| ④ | 30% | 30.8 | 60.5 | 77 | 88 | 80.8 | 80% |
| ⑤ | 0% | — | 20 | 70 | 95 | 100 | 100% |

Figure 14:
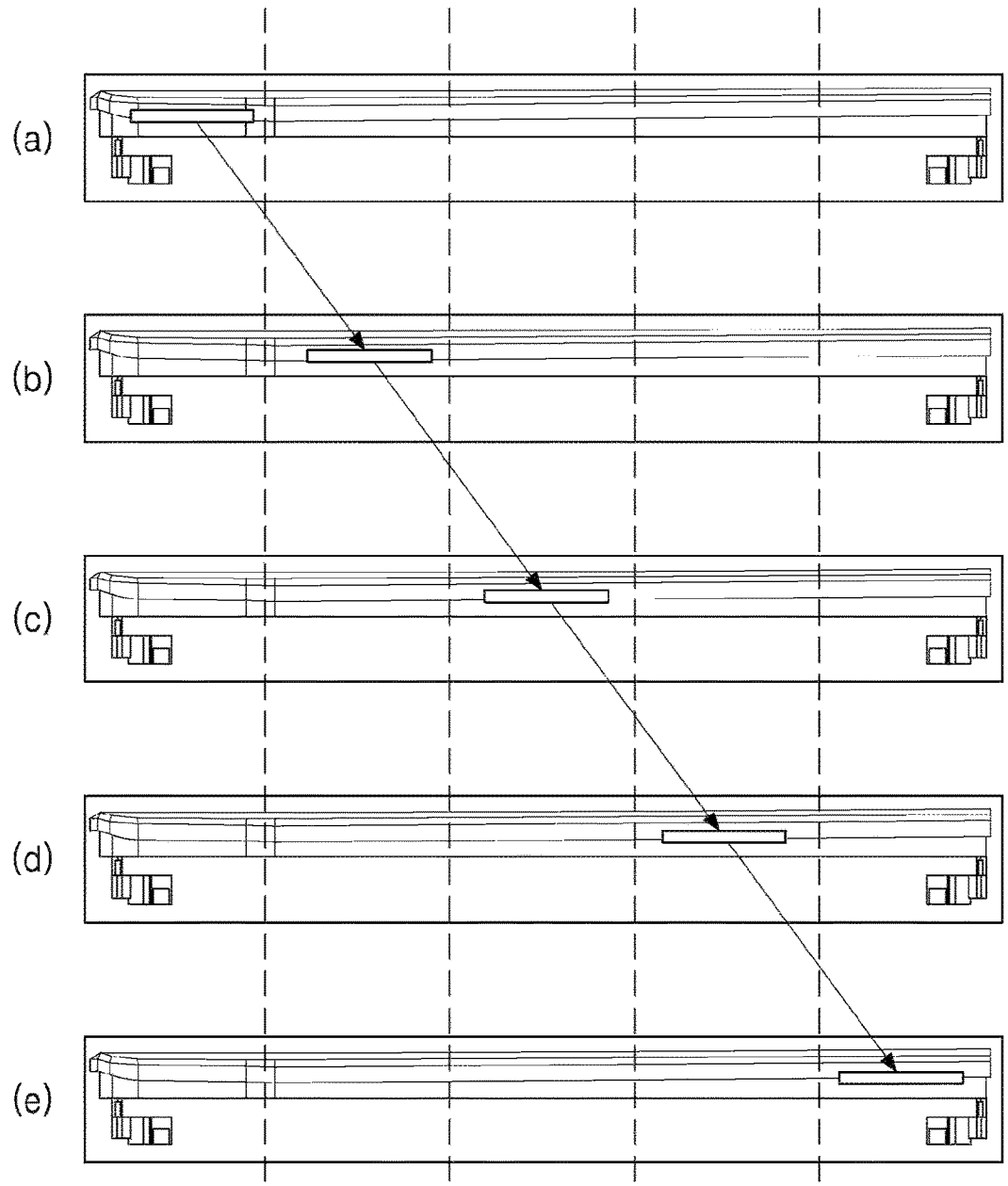
FIG. 14 is a schematic view illustrating an operating state of a modification of a dynamic lamp device according to an embodiment of the present invention.

In this case, Table 1 shows different light output intensities based on a maximum output intensity of the left and right lamp light source units 330L and 330R, and different light output intensities based on a maximum output intensity for zones A to E divided along the length of the lamp light delivery unit 320 according to operating stages of FIG. 14. Here, a zone representing the maximum light output intensity at each operating stage is indicated by a dark color. Unlike the three zones as described above, a light output intensity value at a zone having the maximum output intensity at each operating stage has a certain deviation with respect to each operating stage due to the number of zones subdivided for the entire length of the lamp light delivery unit. This deviation may be controlled to make visual recognition of such deviation impossible through a faster transition of each operating stage. In addition, in some cases, a deviation in the maximum light output intensity value for each zone may be controlled in the following manner. For example, the light output intensity of the left lamp light source unit is not changed immediately from 100% to 80% upon a transition from a first operating stage ① to a second operating stage ②, but a change in the light output intensity of the lamp light source units for each operating stage is achieved in a non-intermittent but intermittently segmented manner or in a substantially consecutive manner as if values between the light output intensities 100% and 80% were subdivided and changed consecutively by a different value of 2% during an interval time between each operating stage, so that a visual effect of the dynamic lighting mode with no sense of heterogeneity can be provided to a user.

Hereinafter, a method for controlling a dynamic lamp device 10 according to another aspect of the present invention will be described in detail with reference to the accompanying drawings.

Figure 15:
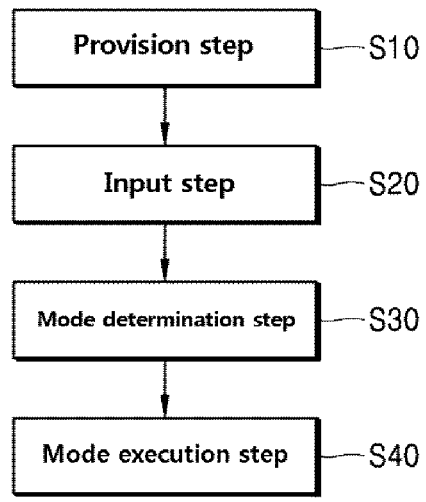
FIGS. 15 to 17 are flowcharts illustrating a method of controlling a dynamic lamp device according to an embodiment of the present invention.
Figure 16:
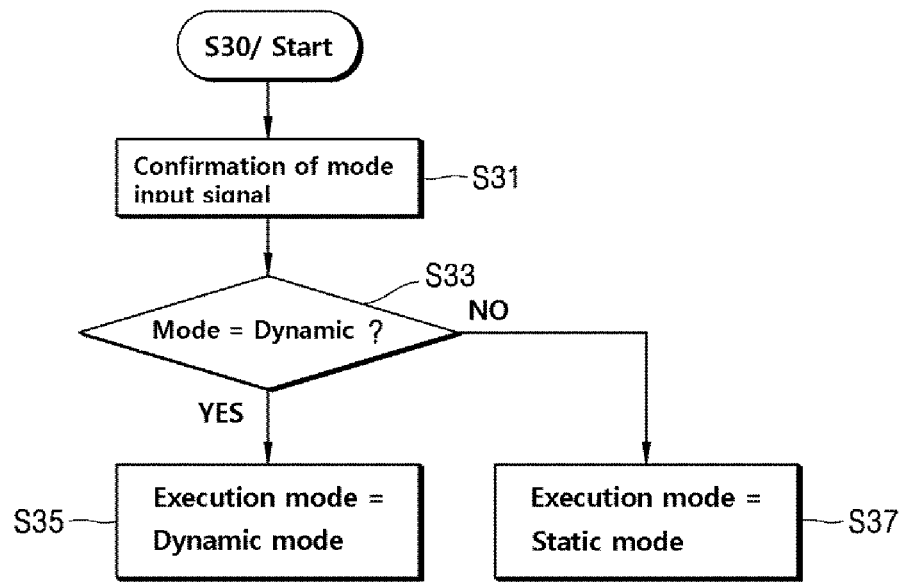
Figure 17:
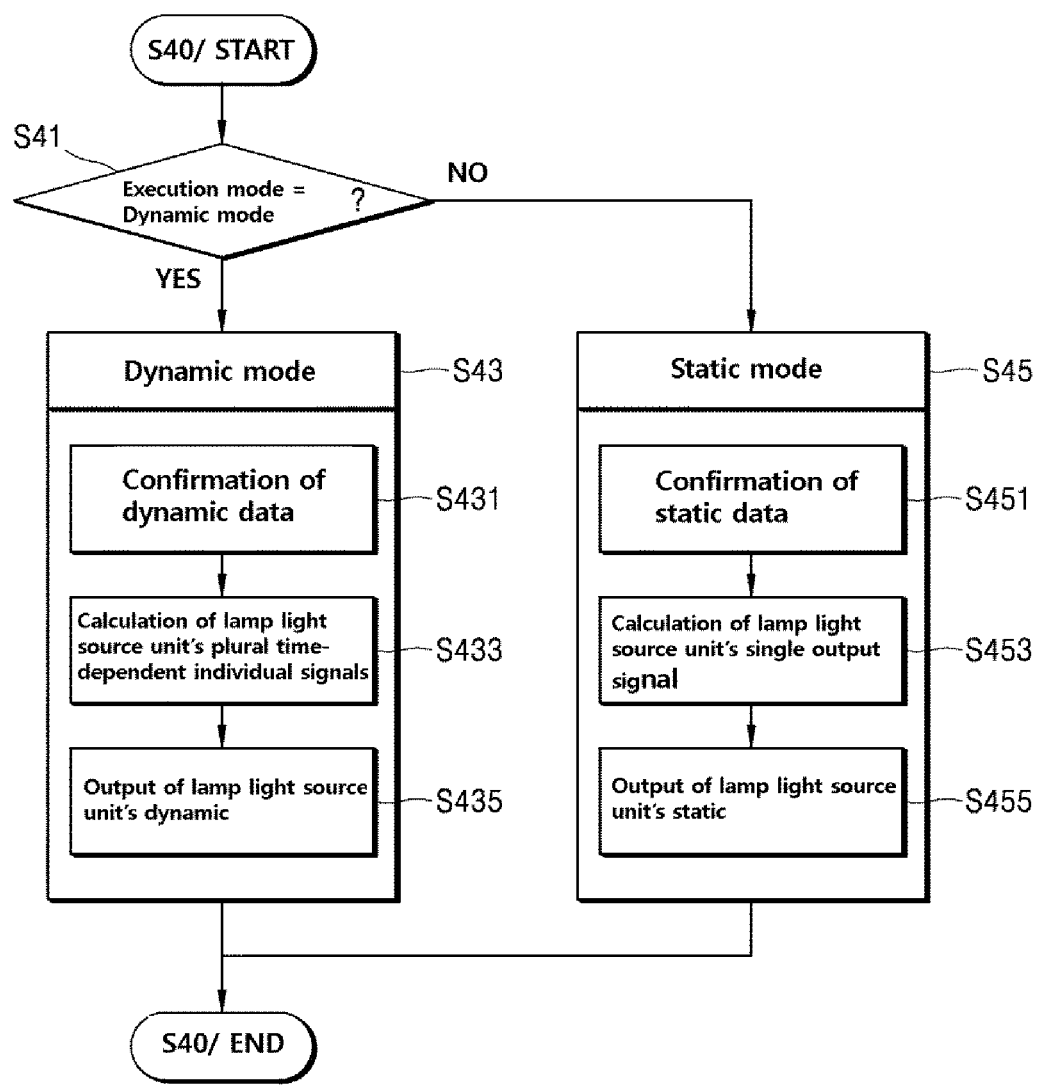

FIGS. 15 to 17 show flowcharts of a control method of the dynamic lamp device 10 of the present invention.

First, the method for controlling a dynamic lamp device of the present invention includes a provision step S10 of providing the dynamic lamp device 10, and a description of the execution of the provision step S10 will be replaced with the previously mentioned related description.

After the provision step S10 has been executed in which the dynamic lamp device 10 is provided, the control unit 20 executes an input step S20. In the input step S20, an input signal inputted by a user through an input unit 60 is applied to the control unit 20. In other words, in the input step S20, the input signal inputted by a user through an input unit 60 and applied to the control unit 20 includes a mode input signal for selecting a lighting mode which the user desires to execute through the dynamic lamp device 10. Then, the mode input signal is applied to the control unit 20 and then information regarding the operating mode which the user desires to execute is stored in the storage unit 30.

Thereafter, the control unit 20 executes a mode determination step S30. In the mode determination step S30, the control unit 20 determines an operating mode selected based on the mode input signal and the preset data.

The mode determination step S30 includes a mode input signal confirmation step S31, a dynamic mode determination step S33, and a mode setting step S35/S37.

In the mode input signal confirmation step S31, the control unit 20 confirms the application of the mode input signal inputted by the user through the input unit 60 and stored in the storage unit 30. Then, the program proceeds to the dynamic mode determination step S33 where the control unit 20 determines whether the operating mode selected by the user based on the mode input signal and the preset data stored in the storage unit 30 is a dynamic mode or a static mode. Herein, the static mode represents an output mode of outputting simple light in a fixed state as mentioned above, and the dynamic mode represents a predetermined lighting mode of changing an output signal continuously for visual recognition to enable to visually recognize the dynamic change of the illumination state.

In other words, the control unit 20 determines whether the operating mode selected by the user is the static mode of merely maintaining the output state of light in a fixed state, or the dynamic mode of creating a visual change.

In the mode setting step S35/S37, the control unit 20 finally sets an operating mode which is to be executed by the control unit 20 based on a determination result in the dynamic mode determination step S33, and stores the finally set operation mode in the storage unit 30. In other words, if it is determined, as a determination result in step S33, that the operating mode selected by the user is the dynamic mode, the program proceeds to a dynamic mode setting step S35 where the control unit 20 executes the dynamic mode setting step S35 to set the dynamic mode as a mode which is to be executed. On the contrary, if it is determined, as a determination result in step S33, that the operating mode selected by the user is the static mode, the program proceeds to a static mode setting step S37 where the control unit 20 executes the static mode setting step S37 to set the static mode as a mode which is to be executed.

Subsequently, the control unit 20 executes the mode execution step S40. In the mode execution step S40, the control unit 20 applies the light source control signal which is the operating control signal to the lamp light source unit 330 to execute the operating mode determined in the dynamic mode setting step S35.

More specifically, the mode execution step S40 includes a set operating mode confirmation step S41 and a dynamic mode execution step S43. In the set operating mode confirmation step S41, the control unit 20 confirms the operating mode set in the mode determination step S30, and in the dynamic mode execution step S43, the control unit 20 executes the dynamic mode if it is determined that the set operating mode confirmed in the set operating mode confirmation step S41 is a dynamic mode. The dynamic mode execution step S43 includes a dynamic data confirmation step S431, a lamp light source signal calculation step S433, and a lamp light source unit dynamic output step S435.

In the dynamic data confirmation step S431, the control unit 20 confirms dynamic data contained in the preset data. The dynamic data is a value of forming the state of the light output intensity levels of 100%, 80%, 70%, 30%, and 0% as shown in Table 1 above to output a value of a basic light output intensity of light outputted from the lamp light source unit 330, for example, the maximum light output intensity value. The dynamic data contains a function of the light output intensity values formed along the length of the lamp light delivery unit 320, point data regarding a plurality of relevant points, and data regarding the light source control signal which is an electrical signal applied to the lamp light source unit in order to form the function and point data. In addition, the dynamic data may contain, as one type of the operating mode selected by the user, information regarding the number of zones divided along the entire length of the lamp light delivery unit, and regarding the progress direction of a zone having the maxim light output intensity among the zones divided along the entire length of the lamp light delivery unit.

As described above, when intermediate values of the data contained in the dynamic data are needed, the arithmetic unit 40 may calculate the intermediate values through a predetermined arithmetic process in response to the arithmetic control signal from the control unit 20.

Thereafter, the control unit 20 may control the light output intensity by taking a configuration in which the intermediate values are large or small through an arithmetic process such as a multiplication of certain values of the dynamic data, or control the arithmetic process of the arithmetic unit 40 such that calculation of a value necessary for the lamp light source unit 330 is accomplished to enable to output light with the controlled light output intensity. Then, the control unit 20 executes the lamp light source signal calculation step S433.

In the lamp light source signal calculation step S43, the control unit 20 controls the arithmetic unit 40 to calculate lamp light source unit's plural time-dependent individual signals to be outputted from the lamp light source unit based on the mode input signal and the dynamic data which is the preset data.

Subsequently, in the lamp light source signal calculation step S433, the control unit 20 outputs the lamp light source unit's plural time-dependent individual signals calculated in the lamp light source signal calculation step S433 for application to the lamp light source unit 330.

By virtue of such a control process, a lighting mode may be executed which enables visual recognition of the dynamic change of the illumination state, caused by a sequential shift of a zone with the maximum light output intensity among zones divided along the entire length of the lamp light delivery unit 320 due to a sequential change in the light output intensity for the zones divided along the entire length of the lamp light delivery unit 320.

On the other hand, as shown in FIG. 17, the mode execution step S40 further includes a static mode execution step S45. If it is determined in the set operating mode confirmation step S41 that the operating mode set in the mode determination step S30 is the static mode, the program proceeds to the static mode execution step S45 where the control unit 20 executes the static mode execution step S45. The static mode execution step S45 includes a static data confirmation step S451, a lamp light source unit's single output signal calculation step S453, and a lamp light source unit's static output step S455.

In the static data confirmation step S451, the control unit 20 confirms static data contained in the preset data. The static data represents information regarding the light output intensity of light basically outputted in a fixed state from the lamp light source unit 330.

Thereafter, the controller unit 20 can control the light output intensity or based on the static data or control the arithmetic process of the arithmetic unit 40 so that calculation of a value required for the lamp light source unit 330 is accomplished so as to output light with the controlled light output intensity. Then, the program proceeds to the lamp light source unit's single output signal calculation step S453 where the control unit 20 executes the lamp light source unit's single output signal calculation step S453.

In the lamp light source unit's single output signal calculation step S453, the control unit 20 controls the arithmetic unit 40 to calculate the light source control signal to be outputted from the lamp light source unit based on the mode input signal and the static data.

Subsequently, the program proceeds to the lamp light source unit's static output step S455 where the control unit 20 outputs the light source control signal of the lamp light source unit, calculated in the lamp light source unit's single output signal calculation step S453 for application to the lamp light source unit 330.

In the meantime, the dynamic lamp device 10 according to the present invention may include a configuration in which a combination of light output intensities of light outputted from the lamp light delivery unit along the entire length of the lamp light delivery unit is more smoothly achieved to more strengthen the execution of the dynamic lighting mode. For example, through general linearization of a length-dependent change in the light output intensity of light outputted from the lamp light delivery unit along the entire length of the lamp light delivery unit, a configuration may be implemented in which when a combination of lights emitted from the left and right lamp light source units at both ends of the lamp light delivery unit is achieved, a consecutive change in the zone or position with the maximum light output intensity according to the length or zone of the lamp light delivery unit is facilitated.

To this end, the lamp light delivery unit 320 of the dynamic lamp device 10 of the present invention may include a predetermined surface pattern unit disposed on a surface thereof.

The surface pattern unit 400 may be embossed in a projected shape on the surface of the lamp light delivery unit 320. In this embodiment, the surface pattern unit 400 includes a triangular projection shape (see FIG. 18) with respect to a plane including the length of the lamp light delivery unit. The lamp light delivery unit 320 includes a lamp light delivery body 321 and a lamp light delivery stepped portion 323 steppedly formed on the top surface of the lamp light delivery body 321. The lamp light delivery body 321 typically has a circular pipe shape. The lamp light delivery stepped portion is preferably formed for smooth embossing treatment of the surface pattern unit on one surface of the lamp light delivery body 321.

The surface pattern unit 400 is formed in a triangular projection shape in which the length of the base of the surface pattern unit 400 is denoted by 1, the height thereof is denoted by d, and the width thereof is denoted by w when viewed from a plane perpendicular to the length direction of the lamp light delivery unit. The length 1 of the base of the surface pattern unit 400 is set to have the same value with respect to a plurality of surface pattern units, and the arrangement distance of the triangular projections formed along the length of the lamp light delivery unit 320 is denoted by s.

Figure 18:
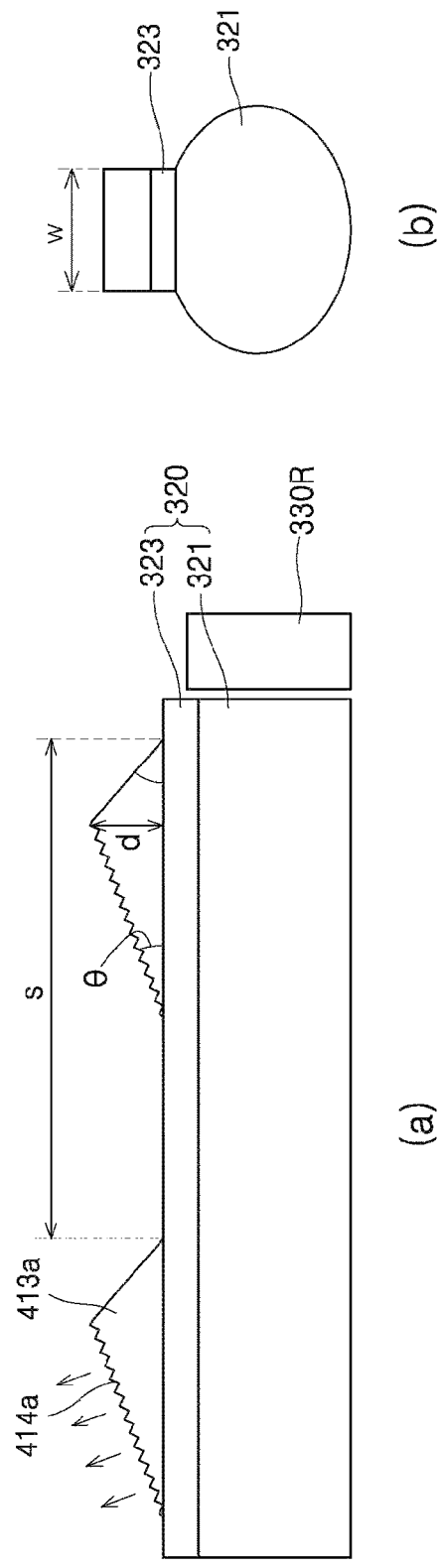
FIGS. 18 and 19 are schematic, partially exploded, side cross-sectional views illustrating the case where a surface pattern unit is formed on a dynamic lamp device according to an embodiment of the present invention.

More specifically, the surface pattern unit 400 includes a light exit surface 414a formed thereon in a direction in which at least one of the lamp light source units 330 is oriented toward the other thereof. As shown in FIG. 18, a face of the surface pattern unit 400, oriented toward a direction in which light emitted from the lamp light source unit 330 disposed at the right end of the lamp light delivery unit 320 is delivered is formed as the light exit surface 414a. The light exit surface 414a according to an embodiment of the present invention can be unevenly treated for smooth emission of light toward a relevant direction. The light exit surface 414a may be surface-treated such that emission of light in a desired direction is achieved by preventing the total reflection of light through the uneven surface treatment such as laser etching.

Figure 32:
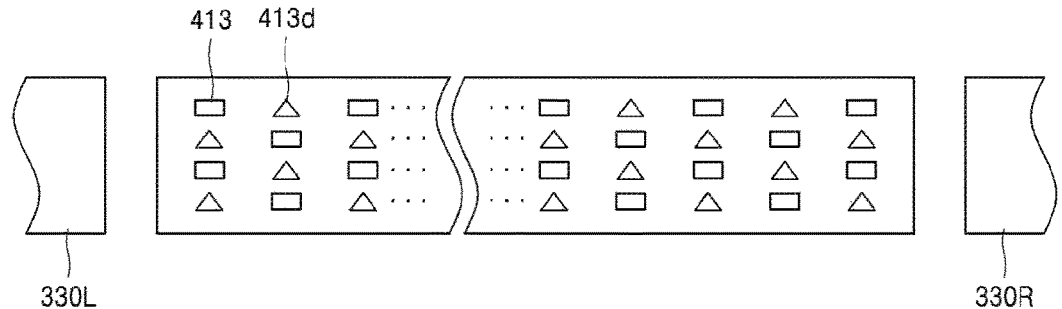
FIG. 32 is a schematic partial top plan view illustrating a surface pattern unit formed on a dynamic lamp device according to an embodiment of the present invention.

On the contrary, unlike the case in FIG. 18, a plurality of surface pattern units 413 and 413d can be formed to have a configuration in which the progress direction of light emitted from the left lamp light source unit opposed to the right lamp light source unit is formed as a mirror image reversed with respect to an image shown in FIG. 18. These surface pattern units 413d can be uniformly dispersed as shown in FIG. 32, thus enabling formation of a linear light output intensity pattern of light emitted from each direction of the surface pattern units.

Such a surface pattern unit may have a configuration which achieves a change in the angle, the height and the width thereof along the length of the lamp light delivery unit.

Figure 20:
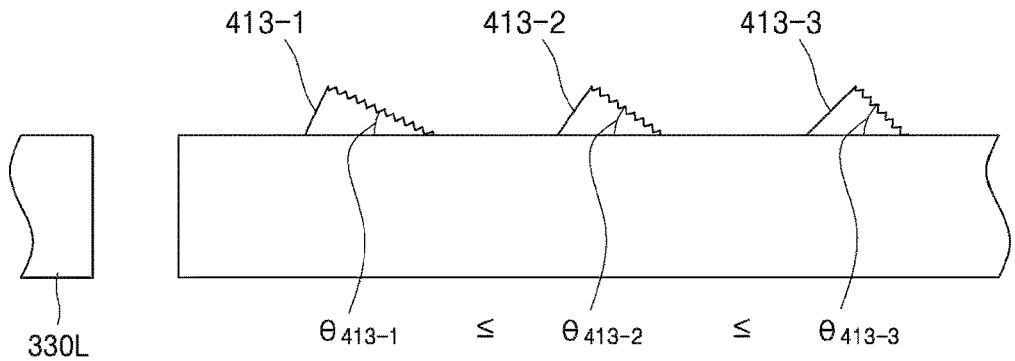
FIGS. 20 to 31 are schematic, partially exploded, side cross-sectional views illustrating a surface pattern unit formed on a dynamic lamp device according to an embodiment of the present invention.
Figure 21:
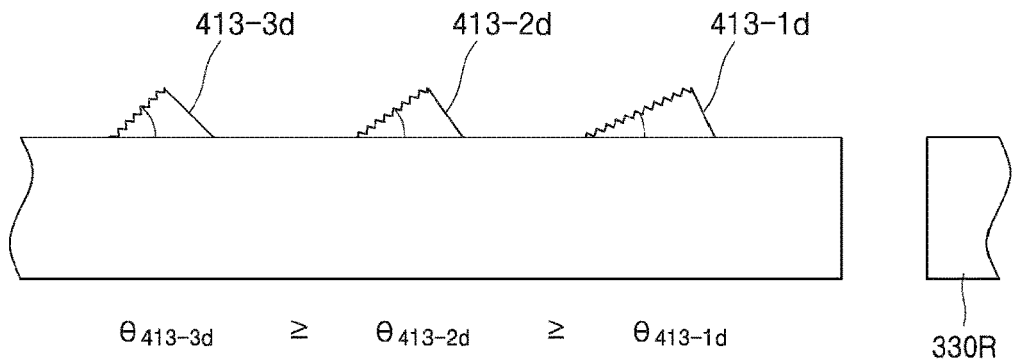
Figure 22:
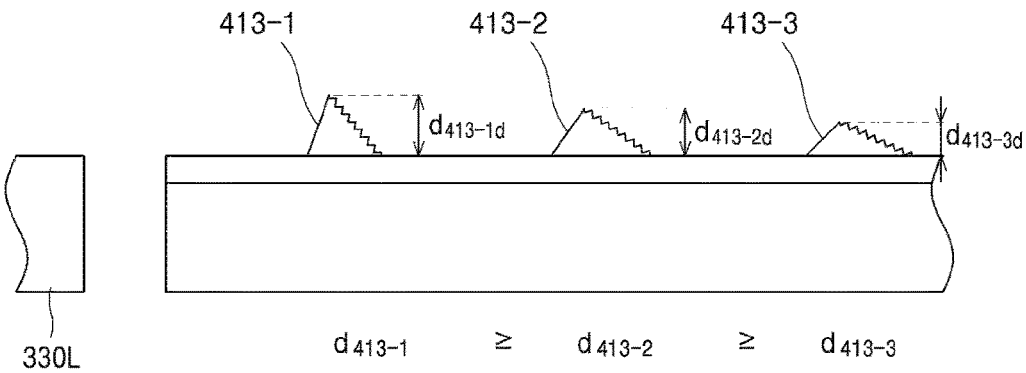
Figure 23:
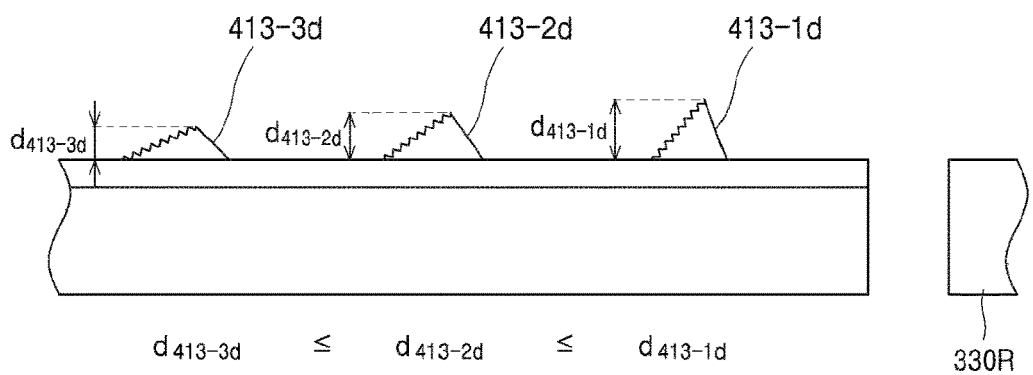
Figure 24:
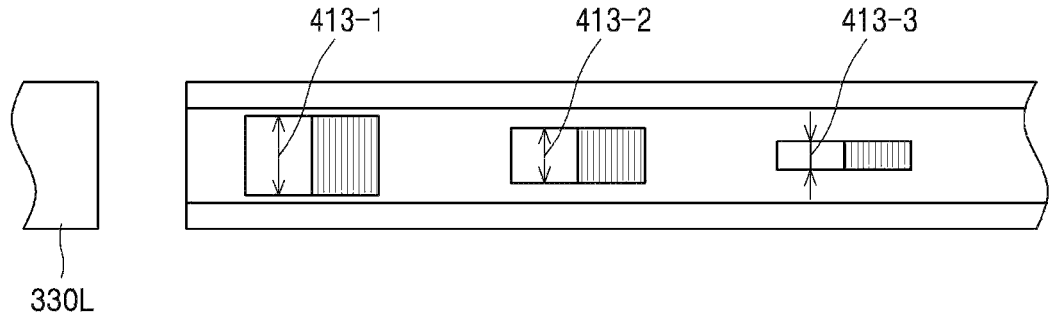
Figure 25:
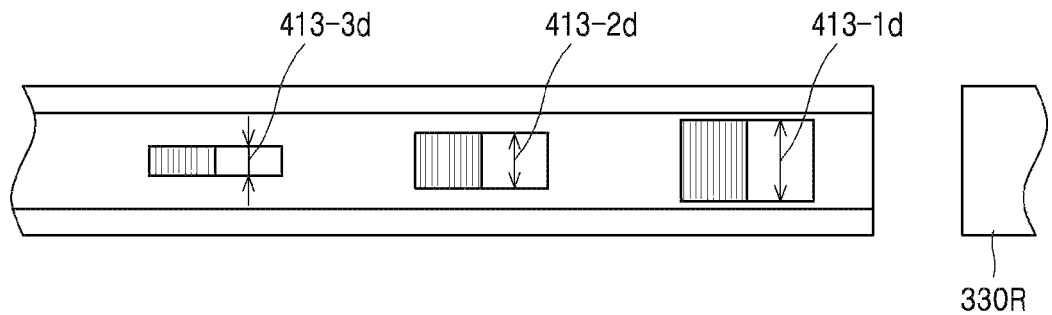
Figure 26:
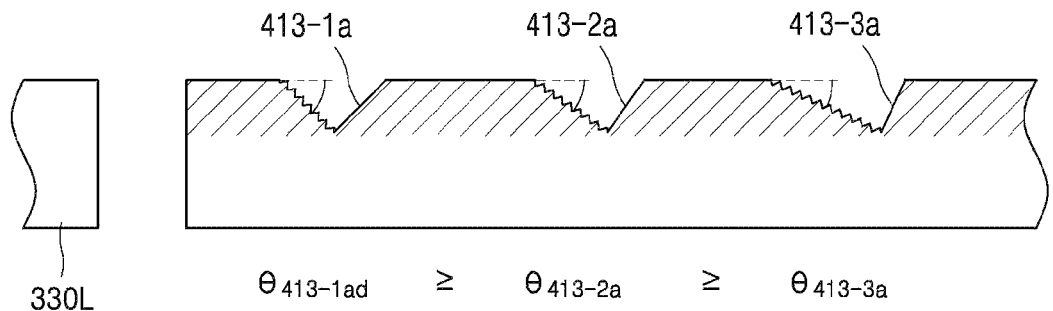
Figure 27:
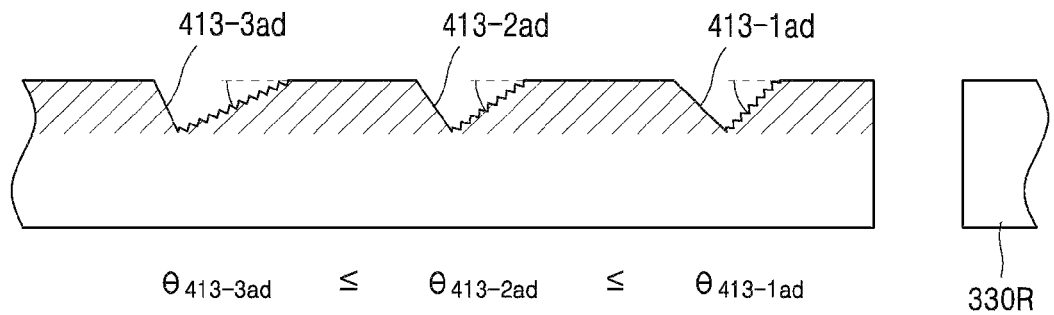
Figure 28:
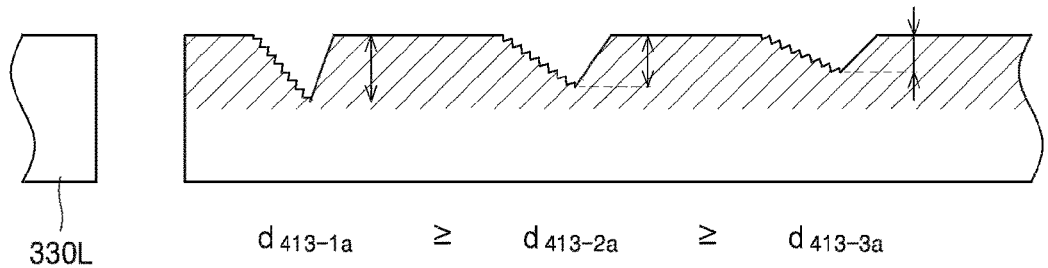
Figure 29:
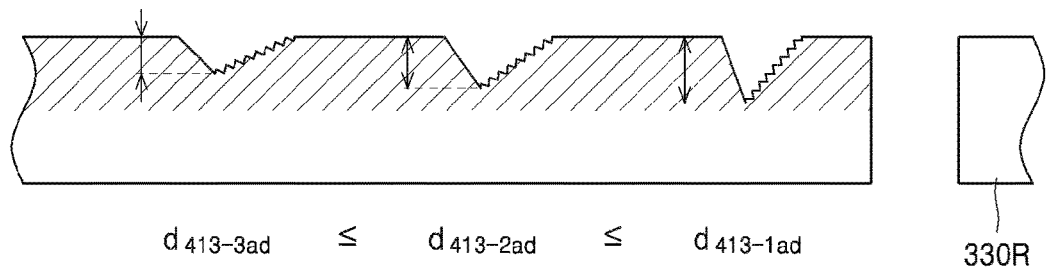
Figure 30:
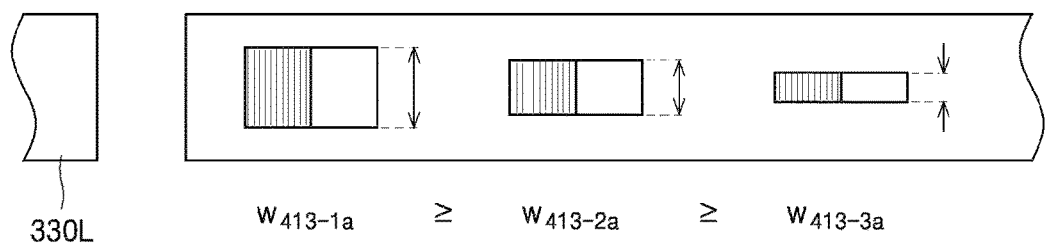
Figure 31:
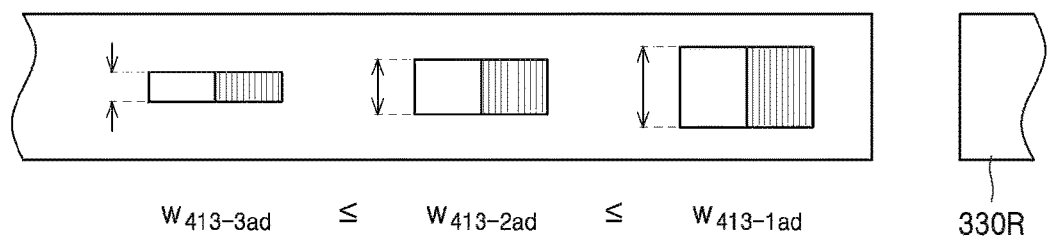

FIGS. 20 and 21 show left- and right-oriented surface pattern units based on an angle, FIGS. 22 and 23 show left- and right-oriented surface pattern units based on a height, and FIGS. 24 and 25 show left- and right-oriented surface pattern units based on a width.

In each of FIGS. 20 to 25, there are shown the structures of left- and right-oriented surface pattern units (413-1, 413-2 and 413-3; 413-1$d$, 413-2$d$ and 413-3$d$), changed as it goes from any one of the lamp light source units 330L and 330R toward the other along the length of the lamp light delivery unit 320. The change in the structures of the left- and right-oriented surface pattern units along the length of the lamp light delivery unit is associated with the light exit surface 414a oriented toward the lamp light source unit disposed at any one end of the lamp light delivery unit from the lamp light source unit disposed at the other end of the lamp light delivery unit. As described above, the surface pattern units corresponding to the left and right lamp light source units can be modified in various manners such as being dispersedly disposed on the surface of the lamp light delivery unit as shown in FIG. 32.

As shown in FIGS. 20 to 25, the surface pattern unit 400 includes a light exit surface 414 oriented in the direction in which it goes from at least one of the lamp light source units 330 toward the other thereof, and the light exit angle ($\theta$413-1, $\theta$413-2, $\theta$413-3; $\theta$413-1$d$, $\theta$413-2$d$, $\theta$413-3$d$) formed between the light exit surface 414 of the surface pattern unit 400 and the surface of the lamp light delivery unit 320 is sequentially increased or equal as it goes from at least one of the lamp light source units 330 toward the other thereof and vice-versa ($\theta$413-1$\leq\theta$413-2$\leq\theta$413-3; $\theta$413-1$d\leq\theta$413-2$d\leq\theta$413-3$d$).

In addition, the height (d413; d413-1, d413-2, d413-3; d413-1$d$, d413-2$d$, d413-3$d$) of the surface pattern unit 400 from the surface of the lamp light delivery unit 320 is sequentially reduced or equal as it goes from at least one of the lamp light source units 330 toward the other thereof and vice-versa (d413-1$\geq$d413-2$\geq$d413-3;d413-1$d\geq$413-2$d\geq$413-3$d$).

Further, the width (w413) of the surface pattern unit 400 when projected onto a plane parallel to the length direction of the lamp light delivery unit 320 is sequentially reduced or equal as it goes from at least one of the lamp light source units 330 toward the other thereof and vice-versa(w413-3≤413-2≤413-1;w413-3d≤413-2d≤413-1d).

By virtue of such mechanical characteristics, the linear pattern of the light output intensity formed along the length of the lamp light delivery unit can be implemented so that the dynamic lighting mode can be executed which employs a minimum number of the lamp light source units disposed along the length of the light delivery unit 320.

Figure 19:
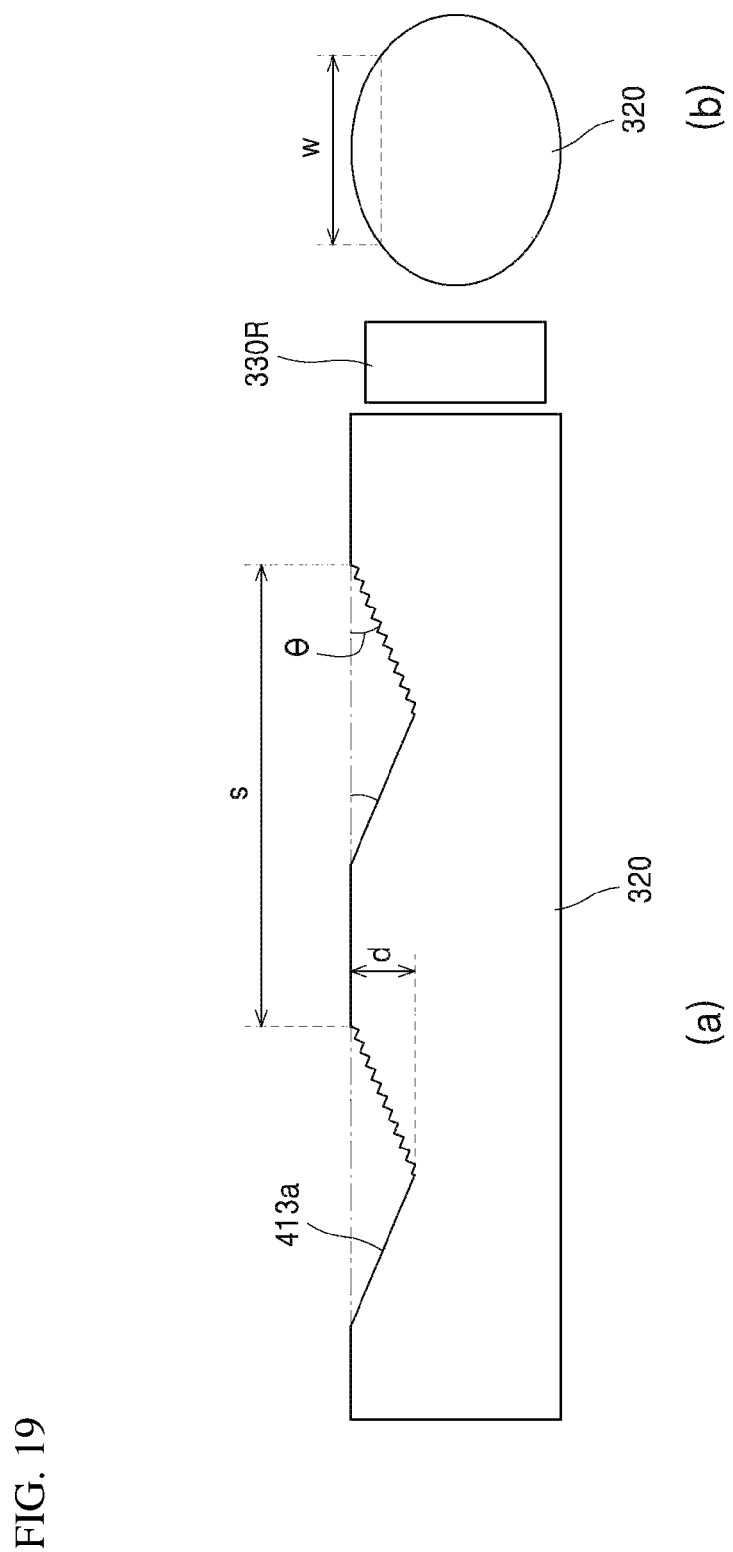

In the meantime, in the previous embodiment, the surface pattern unit has a triangular embossed projection shape, but the present invention is not limited thereto. In other words, the surface pattern unit 400 may be engraved in a recessed shape on the surface of the lamp light delivery unit 320 as shown in FIG. 19.

The surface pattern unit 400 can be engraved in a recessed shape on the surface of the lamp light delivery unit 320. The surface pattern unit 400 has a triangular recess shape with respect to a plane including the length of the lamp light delivery unit (see FIG. 19) in this embodiment. The lamp light delivery unit 320 generally has a cylindrical pipe shape. The surface pattern unit 400 is preferably formed in the shape of a triangular recess 412a which is directly engraved on the surface of the lamp light delivery unit 320

The surface pattern unit 400 is formed in a triangular recess shape in which the length of the base of the surface pattern unit 400 is denoted by 1, the height (depth) thereof is denoted by d, and the width thereof is denoted by w when viewed from a plane perpendicular to the length direction of the lamp light delivery unit. The length 1 of the base of the surface pattern unit 400 is set to have the same value with respect to a plurality of surface pattern units, and the arrangement distance of the triangular recesses formed along the length of the lamp light delivery unit 320 is denoted by s.

More specifically, the surface pattern unit 400 includes a light exit surface 414a formed thereon in a direction in which at least one of the lamp light source units 330 is oriented toward the other thereof. As shown in FIG. 18, a face of the surface pattern unit 400, oriented toward a direction in which light emitted from the lamp light source unit 330 disposed at the right end of the lamp light delivery unit 320 is delivered is formed as the light exit surface 414a. The light exit surface 414a according to an embodiment of the present invention can be unevenly treated for smooth emission of light toward a relevant direction. The light exit surface 414a may be surface-treated such that emission of light in a desired direction is achieved by preventing the total reflection of light through the uneven surface treatment such as laser etching. This is the same as in the case where the surface pattern unit 400 is embossed as described previously.

As shown in FIGS. 26 to 31, the surface pattern unit 400 includes a light exit surface 414a oriented in the direction in which it goes from at least one of the lamp light source units 330 toward the other thereof, and the light exit angle(θ413-1a,θ413-2a,θ413-3a; θ413-1ad,θ413-2ad,θ413-3ad) formed between the light exit surface 414a of the surface pattern unit 400 and the surface of the lamp light delivery unit 320 is sequentially reduced or equal as it goes from at least one of the lamp light source units 330 toward the other thereof and vice-versa (θ413-1a, θ413-2a, θ413-3a; θ413-1ad, θ413-2ad, θ413-3ad).

In addition, the height (depth, d413-1a, d413-2a, d413-3a; d413-1ad, d413-2ad, d413-3ad) of the surface pattern unit (400) from the surface of the lamp light delivery unit (320) is sequentially reduced or equal as it goes from at least one of the lamp light source units 330 toward the other thereof or vice-versa (d413-3a≤d413-2a≤d413-1a; d413-3ad≤d413-2ad≤d413-1ad).

Further, the width (w413) of the surface pattern unit 400 when projected onto a plane parallel to the length direction of the lamp light delivery unit 320 is sequentially reduced or equal as it goes from at least one of the lamp light source units 330) toward the other thereof or vice-versa (w413-3a≤413-2a≤413-1a;w413-3ad≤w413-2ad≤w413-1ad).

In addition, meanwhile, although the dynamic lamp device and control method thereof in accordance with the present invention has been described focusing on its installation in the interior space of the vehicle in the above embodiments, it can be implemented in various manners depending on design specifications, such as being installed in the indoor or outdoor space of the vehicle other than the door of the vehicle within the scope of implementing a predetermined dynamic lighting function. In some cases, the dynamic lamp device and control method thereof in accordance with the present invention can also be implemented in devices other than the vehicle.

The above-described embodiments are merely examples for explaining the present invention and are not intended to limit the present invention. For example, although the shape of the lamp light delivery unit 320 has been described focusing on a linear or curved shape in the previous embodiments according to the present invention, the lamp light delivery unit of the present invention may have a branched structure, e.g., a three-branched line structure in which one end is arranged at the left side of the lamp light delivery unit and two ends are arranged at the right side thereof, and it can be modified in various manners depending design specifications, such as being configured centering on a combination of colors of light at each zone, but not a light output intensity thereof.

INDUSTRIAL APPLICABILITY

Although the dynamic lamp device and control method thereof in accordance with the present invention has been described focusing on its installation in the interior space of the vehicle, it can be implemented in various manners depending on design specifications, such as being installed either as an indoor interior lighting or in the interior space of an aircraft, including its installation in the indoor or outdoor space of the vehicle other than the door of the vehicle within the scope of implementing a predetermined dynamic lighting function. In some cases, the dynamic lamp device and control method thereof in accordance with the present invention can also be implemented in devices other than the vehicle.

The invention claimed is:
1. A dynamic lamp device (10) comprising:
a housing (100);
a substrate unit (200) disposed on the housing; and
a lamp unit (300) at least partially connected to the substrate unit (200) and configured to allow light emitted therefrom to exit the housing (100) toward outside of the housing,
wherein the lamp unit (300) comprises:
a light delivery unit (320) disposed in the housing (100) and having a predetermined length;
a lamp light source unit (330) disposed at each of ends of the lamp light delivery unit (320) and configured to deliver light emitted therefrom to the lamp light delivery unit (320); and a control unit (20) configured to apply a light source control signal to the lamp light source unit (330) disposed at each of the ends of the lamp light delivery unit (320) to change an intensity of light delivered to the lamp light delivery unit (320) to cause a predetermined intensity zone having a predetermined light intensity to be shifted along a length of the lamp light delivery unit (320), light having the predetermined light intensity being output from the lamp light delivery unit (320);

wherein the control unit is configured to control operating stages so that a change in a light output intensity of the lamp light source unit for each of the operating stages is applied wherein values between light output intensities are subdivided and changed consecutively by a different value during an interval time between each operating stage.

2. The dynamic lamp device (10) according to claim 1, wherein the predetermined light intensity of the light output from the lamp light delivery unit (320) in response to the light source control signal applied to the lamp light source unit (330) from the control unit (20) comprises a plurality of levels of light intensity.

3. The dynamic lamp device (10) according to claim 2, wherein the ends of the lamp light delivery unit (320) are respectively disposed at a left part and a right part of the lamp light source unit (330).

4. The dynamic lamp device (10) according to claim 2, wherein the lamp light delivery unit (320) comprises a predetermined surface pattern unit formed on a surface thereof.

5. The dynamic lamp device (10) according to claim 4, wherein the surface pattern unit is embossed in a projected shape on the surface of the lamp light delivery unit (320).

6. The dynamic lamp device (10) according to claim 5, wherein the surface pattern unit comprises a light exit surface (414) oriented in a direction from one of a left part or a right part of the lamp light source unit (330) toward another of the left part or the right part, and a light exit angle formed between the light exit surface of the surface pattern unit and the surface of the lamp light delivery unit (320) is sequentially increased or unchanged in a direction from the one of the left part or the right part of the lamp light source unit (330) toward the other of the left part or the right part and vice-versa.

7. The dynamic lamp device (10) according to claim 5, wherein a height (d413, d413a) of the surface pattern unit from the surface of the lamp light delivery unit (320) is sequentially reduced or unchanged in a direction from one of a left part or a right part of the lamp light source unit (330) toward another of the left part or the right part and vice-versa.

8. The dynamic lamp device (10) according to claim 5, wherein a width (w413) of the surface pattern unit when projected onto a plane parallel to a length direction of the lamp light delivery unit (320) is sequentially reduced, increased or unchanged in a direction from one of a left part or a right part of the lamp light source unit (330) toward another of the left part or the right part and vice-versa.

9. The dynamic lamp device (10) according to claim 4, wherein the surface pattern unit is engraved in a recessed shape on the surface of the lamp light delivery unit (320).

10. The dynamic lamp device (10) according to claim 9, wherein the surface pattern unit comprises a light exit surface (414) oriented in a direction from one of a left part or a right part of the lamp light source unit (330) toward another of the left or the right part, and a light exit angle formed between the light exit surface (414) of the surface pattern unit and the surface of the lamp light delivery unit (320) is sequentially reduced or unchanged in a direction from one of the left part or the right part of the lamp light source unit (330) toward another of the left part or the right part and vice-versa.

11. The dynamic lamp device (10) according to claim 9, wherein a width (w413) of the surface pattern unit when projected onto a plane parallel to a length direction of the lamp light delivery unit (320) is sequentially reduced or unchanged in a direction from one of a left part or a right part of the lamp light source unit (330) toward another of the left part or the right part and vice-versa.

12. The dynamic lamp device (10) according to claim 4, wherein the surface pattern unit comprises a light exit surface (414) oriented in a direction from one of a left part or a right part of the lamp light source unit (330) toward another of the left part or the right part, and
  wherein the light exit surface (414) is surface-treated unevenly.

13. A method for controlling a dynamic lamp device, the method comprising:
  a provision step (S10) of providing the dynamic lamp device (10) comprising: a housing (100); a substrate unit (200) disposed on the housing; and a lamp unit (300) at least partially connected to the substrate unit (200) and configured to allow light emitted therefrom to exit the housing (100) toward outside of the housing, wherein the lamp unit (300) comprises: a lamp light delivery unit (320) disposed in the housing (100) and having a predetermined length; a lamp light source unit (330) disposed at each of ends of the lamp light delivery unit (320) and configured to deliver light emitted therefrom to the lamp light delivery unit (320); and a control unit (20) configured to apply a light source control signal to the lamp light source unit (330) disposed at each of the ends of the lamp light delivery unit (320) to change an intensity of light delivered to the lamp light delivery unit (320) to cause a predetermined intensity zone having a predetermined light intensity to be shifted along a length of the lamp light delivery unit (320), light having the predetermined light intensity being output from the lamp light delivery unit; an input unit (60) configured to allow a select input signal for selecting an operating mode of the lamp light source unit (330) by a user to be inputted thereto; and a storage unit (30) connected to the control unit (20) and configured to store preset data containing information regarding the operating mode;
  an input step (S20) of allowing the user to input a mode input signal to be applied to the control unit 20;
  a mode determination step (S30) of allowing the control unit (20) to determine an operating mode selected based on the mode input signal and the preset data;
  a mode execution step (S40) of allowing the control unit (20) to apply an operating control signal to the lamp light source unit (330) to execute the operating mode determined in the mode determination step (S30); and
  a step of controlling operating stages so that a change in a light output intensity of the lamp light source unit for each of the operating stages is performed wherein values between light output intensities are subdivided and changed consecutively by a different value during an interval time between each operating stage.

14. The method for controlling a dynamic lamp device according to claim 13, wherein the mode determination step (S30) comprises:
- a mode input signal confirmation step (S31) of allowing the control unit (20) to confirm application of the mode input signal inputted by the user through the input unit (60);
- a dynamic mode determination step (S33) of allowing the control unit (20) to determine whether or not the operating mode selected by the user based on the mode input signal and the preset data is a dynamic mode; and
- a mode setting step (S35, S37) of finally setting an operating mode which is to be executed by the control unit (20) based on a determination result in the dynamic mode determination step (S33).

15. The method for controlling a dynamic lamp device according to claim 14, wherein the mode execution step (S40) comprises:
- a set operating mode confirmation step (S41) of allowing the control unit (20) to confirm the operating mode set in the mode determination step (S30); and
- a dynamic mode execution step (S43) of allowing the control unit (20) to executes the dynamic mode if it is determined that the set operating mode confirmed in the set operating mode confirmation step (S4)1 is the dynamic mode, and wherein the dynamic mode execution step (S43) comprises:
- a dynamic data confirmation step (S431) of allowing the control unit (20) to confirm dynamic data contained in the preset data;
- a lamp light source signal calculation step (S433) of allowing the control unit (20) to control an arithmetic unit (40) connected to the control unit (20) to calculate plural time-dependent individual signals of the lamp light source unit to be output from the lamp light source unit based on the mode input signal and the preset data; and
- a lamp light source unit dynamic output step (S435) of allowing the control unit (20) to output the plural time-dependent individual signals calculated in the lamp light source signal calculation step (S433) for application to the lamp light source unit (330).

* * * * *